United States Patent Office 2,741,562
Patented Apr. 10, 1956

2,741,562

HIGH EXPANSION PLASTER COMPOSITIONS

Holly G. Haworth, Bryn Mawr, Pa., assignor to Certain-teed Products Corporation, Ardmore, Pa., a corporation of Maryland No Drawing. Application July 31, 1952,
Serial No. 301,967

7 Claims. (Cl. 106—109)

This invention relates to plaster compositions, and more particularly to a high expansion, quick-setting plaster composition.

It is a well recognized principle in the art that glue, such as powdered animal glue and the like, may be added to gypsum plaster compositions for the purpose of increasing the expansion during the setting thereof over and above that which develops when the gypsum plaster alone is mixed with water and allowed to set. The present invention is concerned with this principle, since there are many applications requiring the use of high expansion gypsum plaster compositions, that is, gypsum plaster compositions having a degree of setting expansion greater than that of the gypsum plaster per se. As an example of such an application, a high expansion gypsum plaster composition is chosen in making molds for casting Kirksite metal, since this metal shrinks during the time that it cools following the casting operation. Naturally it becomes highly desirable to use the mold as soon as possible after preparing the same, but with present-day techniques of preparing high expansion gypsum plaster compositions it is necessary to allow the mold to set for from 8 to 12 hours, at least, even after the mold has set to a firm rigid shape, this being due to the fact that with compositions presently known to the art substantial expansion continues long after the mold has become rigid. Thus, for instance, casting techniques depending upon the use of high expansion plaster compositions are delayed, and it is generally impossible to predict, with any degree of accuracy, just what the expansion of such a mold might be after the first hour or so following the preparation and casting of the mold itself.

Therefore, it is the primary object of this invention to decrease the time required for a high expansion gypsum plaster composition to reach the outer or practical limit of its selected expansion, and a related object is to permit shapes and forms prepared from such compositions to be used within an hour or so after pouring the same. A further object of the present invention is to promote the utility of casting operations by affording a plaster composition that does not require prolonged standing to assure that the outer limits of expansion have been reached.

Further objects will be apparent to those skilled in the art from the disclosure to follow, particularly in view of the novel plaster composition disclosed below.

The present invention is concerned with a gypsum plaster composition comprising calcined gypsum plaster and animal glue, the latter as one ingredient for increasing the expansion of the composition, and sodium fluoride which I have found to so alter the expansion and setting characteristics of the composition and the effects of the glue, or its equivalent, that once the composition is poured to a particular shape or form the latter may be used within an hour or so after the pouring or casting operation. Thus, the net effect of the sodium fluoride is to reduce the total expansion somewhat so that a greater amount of glue, or its equivalent, and pulverized gypsum can be used to obtain the desirable quick set and high rate of expansion without the usual continued expansion which ordinarily occurs after the desired expansion has been reached and which has characterized the compositions of this class in the prior art.

The following is a typical formula, producing a setting expansion of 1.174% at a pouring consistency of water-to-plaster (W/P) of 43. A mold prepared from the same may be used one hour after pouring.

EXAMPLE I

| Ingredient: | Percent by weight |
|---|---|
| High-strength gypsum plaster | 96.40 |
| Powdered bone glue | 0.82 |
| Powdered sodium fluoride | 0.28 |
| Finely ground set gypsum plaster | 2.50 |

The high-strength gypsum plaster in the above example is the characterizing ingredient of the plaster composition, while the finely ground set gypsum is used as a recognized accelerator for accelerating and stabilizing the setting time of the composition. Pulverized gypsum may be used as well as a substitute for the specified finely ground set gypsum plaster.

Generally speaking, setting expansions of from 0.5% to 1.5% have been obtained while using the ingredients within the ranges indicated in Table I below. The time required for the particular expansion to be obtained does not substantially exceed 60 minutes in any case.

Table I

| Ingredient: | Percent by weight |
|---|---|
| High-strength gypsum plaster | 95.80–98.72 |
| Powdered bone glue | 0.30– 0.90 |
| Powdered sodium fluoride | 0.20– 0.35 |
| Finely ground set gypsum plaster | 0.50– 4.00 |

The high-strength gypsum plaster specified above is a recognized form of gypsum in which the calcined gypsum crystals are of a short, stubby non-porous nature, and it will be appreciated that other forms of calcined gypsum may be used such as the conventional porous and irregular crystalline aggregate form that is obtained in the usual Kettle calcination process. While bone glue has been specified, in particular, animal glue in general is satisfactory. In fact, any equivalent protein recognized as such an alternative may be used as the source for imparting high expansion characteristics to the gypsum composition. For example, a portein flour, gelatin flour for instance, has been substituted for the bone glue with somewhat less satisfactory results from the standpoint of expansion rate. However, the protein flour does have the advantage of being a less powerful retarder, and some of the good effects of both can be attained by using a mixture of bone glue and protein flour.

The selected composition may be mixed with water, at room temperature, to a plastic consistency as in the case of any other plaster composition and then used for the desired purpose.

From the foregoing it will be seen that the present invention affords a high expansion, quick-setting plaster composition that is adapted to greatly improve those operations which depend upon high expansion plasters, and more particularly such operations wherein it is desired to have the set plaster available for use as soon as possible after pouring.

It will also be appreciated from the foregoing that various equivalents falling within the classes of accelerators and expansion producing agents, well known to the art, may be used interchangeably, the particular example in these classes being specified herein by way of preference and availability rather than a limitation on the practice of the present invention.

I claim:
1. A high expansion quick-setting plaster composition consisting essentially of gypsum plaster as the major ingredient, an accelerator, and expansion producing ingredients, said expansion producing ingredients consisting of a proteinaceous material and sodium fluoride.

2. In a composition as recited in claim 1, said sodium fluoride being present in an amount of about 0.20 to 0.35 percent by weight of the total weight of said composition.

3. A plaster composition characterized by a relatively high rate of expansion and ability to attain the desired condition of expansion within a relatively short time after being poured, said composition consisting essentially of gypsum plaster, an accelerator, and expansion producing ingredients, said expansion producing ingredients consisting essentially of a proteinaceous material and sodium fluoride.

4. In a composition as recited in claim 3, in which said proteinaceous material is of the class including protein flour and glue.

5. In a composition as recited in claim 3, in which said accelerator is pulverized gypsum and said proteinaceous material is of the class including animal glue and protein flour.

6. In a composition as recited in claim 3, in which said gypsum plaster is high strength gypsum plaster.

7. A plaster composition characterized by a relatively high rate of expansion and ability to attain the desired condition of expansion within a relatively short time after being mixed with water and poured, said composition consisting essentially of high strength gypsum plaster, an accelerator, and expansion producing ingredients, said expansion producing ingredients consisting of a proteinaceous material and sodium fluoride, said sodium fluoride being present in an amount of about 0.20 to 0.35 percent by weight of the total weight of said composition.

References Cited in the file of this patent

UNITED STATES PATENTS

| | | |
|---|---|---|
| 845,791 | Isaacs | Mar. 5, 1907 |
| 878,382 | Iola | Feb. 4, 1908 |
| 1,895,979 | Dunham | Jan. 31, 1933 |
| 2,071,681 | Brownmiller | Feb. 23, 1937 |
| 2,390,138 | Vallandigham | Dec. 4, 1945 |
| 2,494,403 | Nies et al. | Jan. 10, 1950 |
| 2,523,646 | Buchanan | Sept. 26, 1950 |

FOREIGN PATENTS

| | | |
|---|---|---|
| 12,137 | Great Britain | May 21, 1908 |
| 163,349 | Great Britain | May 26, 1921 |

OTHER REFERENCES

Delmonte, J.: "The Technology of Adhesives," Reinhold Publishing Corp., New York (1947), page 263.

Hadert, H.: "Casein and Its Uses," Chemical Publishing Co., New York (1938), page 40.

Canals, M. E.: "Journal de Pharmacie et de Chemie, vol. 14 (July—December 1916), pp. 33–37; 78–83.